US007014330B2

(12) United States Patent
Yokoyama et al.

(10) Patent No.: US 7,014,330 B2
(45) Date of Patent: Mar. 21, 2006

(54) LIGHTED SWITCH DEVICE

(75) Inventors: Tatsuya Yokoyama, Miyagi-ken (JP); Kazuhiro Tada, Iwate-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 26 days.

(21) Appl. No.: 10/726,407

(22) Filed: Dec. 2, 2003

(65) Prior Publication Data

US 2004/0109304 A1 Jun. 10, 2004

(30) Foreign Application Priority Data

Dec. 3, 2002 (JP) ............................ 2002-351296

(51) Int. Cl.
*G01D 11/28* (2006.01)

(52) U.S. Cl. ............................ 362/23; 362/26; 362/30; 200/184; 200/310

(58) Field of Classification Search .................. 362/23, 362/26, 27, 29, 30, 95; 200/60, 184, 310, 200/313, 317

See application file for complete search history.

(56) References Cited

U.S. PATENT DOCUMENTS

| | | | | |
|---|---|---|---|---|
| 6,176,589 B1 * | 1/2001 | Ishiguro | ...................... | 362/27 |
| 6,299,320 B1 | 10/2001 | Kato et al. | .................... | 362/23 |

FOREIGN PATENT DOCUMENTS

| | | |
|---|---|---|
| DE | 196 27 212 | 1/1998 |

OTHER PUBLICATIONS

Search Report dated Oct. 1, 2004 for European Patent Application No. 03 02 7722.

* cited by examiner

*Primary Examiner*—John Anthony Ward
(74) *Attorney, Agent, or Firm*—Brinks Hofer Gilson & Lione

(57) ABSTRACT

A lighted switch device includes one rotary knob (first operating knob); first to fourth push knobs (second operating knobs); a case; a switch element and a light-emitting diode (light source), which are accommodated in the case; and an annular light conductor for transmitting exiting light from the light-emitting diode to the outer peripheral portion of the rotary knob. Plate-shaped light-shielding members are disposed at the first and third push knobs, and recesses for inserting ends of the light-shielding members are formed in portions of the second and fourth push knobs opposing their respective light-shielding members.

20 Claims, 5 Drawing Sheets

LIGHTED SWITCH DEVICE

BACKGROUND OF THE INVENTION

1. Field of the Invention

The present invention relates to a lighted switch device used in, for example, a control section of a vehicle-installed air conditioner, and, more particularly, to means for preventing undesirable leakage of light from some portion.

2. Description of the Related Art

As shown in FIGS. 4 and 5, a related lighted switch device for a vehicle-installed air conditioner comprises one rotary knob (first operating knob) 1, four push knobs (second operating knobs) 2, 3, 4, and 5 disposed around the rotary knob 1, a case 6 having a front plate 6*a* to which the rotary knob 1 and the push knobs 2, 3, 4, and 5 are mounted, a rotation detector 8 mounted to a wiring board 7 and accommodated in the case 6, switch elements 9, LEDs 10 (light-emitting diodes serving as light sources), and an annular light conductor 11 for transmitting exiting light 10*a* from the LEDs 10 to the outer peripheral portion of the rotary knob 1.

This type of related lighted switch device further comprises an annular light-shielding member 13, disposed at a portion of the case 6 where the light conductor 11 is disposed, for preventing light from leaking into gaps 12 formed between pairs of adjacent push knobs, that is, between the push knobs 2 and 3, between the push knobs 3 and 4, between the push knobs 4 and 5, and between the push knobs 5 and 2.

In the related lighted switch device, since the annular light-shielding member 13 is disposed around the annular light conductor 11, it is possible to prevent light from leaking into the gaps 12, disposed between the respective pairs of adjacent push knobs, from the light conductor 11, so that the lighted switch device can be easily seen.

In the related lighted switch device, since the light-shielding member 13, which is formed at the case 6, is disposed in a gap 14 between the rotary knob 1 and the push knobs 2 to 5, the light-shielding member 13 is viewed concentrically with the light conductor 11 in plan view of the lighted switch device. Therefore, the related lighted switch device is not designed well. In addition, the gap 14 is inevitably large. Therefore, also for this reason, the related lighted switch device is not designed well, thereby increasing the size of the switch device. Further, since the light-shielding member 13 is formed at the case 6, a die used for injection molding of the case 6 is large and complicated. Therefore, the lighted switch device, which is a product, is high in cost.

SUMMARY OF THE INVENTION

Accordingly, the present invention is achieved to overcome the aforementioned related problems, and has as its object the provision of a small low-cost lighted switch device which is designed well.

To this end, according to a basic form of the present invention, there is provided a lighted switch device comprising a first operating knob; a plurality of second operating knobs comprising a pair of adjacent second operating knobs and disposed around the first operating knob; a case having a front plate for mounting the first operating knob and the plurality of second operating knobs; a light source accommodated in the case; a light conductor for transmitting exiting light from the light source to an outer peripheral portion of the first operating knob; and a light-shielding member, which is disposed at one of the pair of adjacent second operating knobs and which protrudes in a gap disposed between the pair of adjacent second operating knobs, for preventing light from leaking into the gap from the light conductor.

In this way, when light is prevented from leaking into the gap from the light conductor by making the light-shielding member, which is disposed at one of the pair of second operating knobs, protrude into the gap disposed between the pair of adjacent second operating knobs, the size of the gap is small, which is, in general, approximately 1 mm. Therefore, the light-shielding member is only slightly seen in plan view of the lighted switch device, so that the design of the lighted switch device can be improved. In addition, it is not necessary to form the light-shielding member at the case, and a gap between the first operating knob and the second operating knobs can be reduced in size. Therefore, also for this reason, the design of the lighted switch device can be improved, thereby reducing the size of the lighted switch device. Further, since it is not necessary to form the light-shielding member at the case, it is possible to simplify and reduce the size of a die used for injection molding of the case, and, thus, to reduce the cost of the lighted switch device, which is a product.

In the basic form, the other of the pair of second operating knobs has a recess for inserting an end of the light-shielding member.

In this way, when the light-shielding member is disposed at one of the pair of adjacent second operating knobs, and a recess for inserting an end of the light-shielding member is formed in the other second operating knob, it is possible to more reliably achieve a light-shielding operation by the light-shielding member compared to the case in which an end portion of the light-shielding member, which is formed at one of the pair of adjacent second operating knobs, is disposed close to a side surface of the other second operating knob. Therefore, it is possible to prevent light from leaking into the gap between the pair of adjacent second operating knobs, so that the design of the lighted switch device can be further improved.

In the basic form, the first operating knob may be a rotary knob, and the plurality of second operating knobs may be push knobs.

In this way, when the first operating knob is a rotary knob, and the second operating knobs are push knobs, it is possible to construct one switch device by a combination of operating knobs operated by different methods. Therefore, by using the rotary knob and the push knobs according to functions, the operability of the switch device can be enhanced. For example, when the push knobs are used for selecting functions, such as automatic-manual switching of a vehicle-installed air conditioner, in-vehicle-defrosting switching, temperature setting, and air volume setting, and when the rotary knob is used for temperature adjustment and air volume adjustment, it is possible to match the operational feel of the knobs and the feel of selecting the respective functions and adjusting the functions. Therefore, the lighted switch device, which is used in a control section of the vehicle-installed air conditioner, provides good operational feel.

DESCRIPTION OF THE PREFERRED EMBODIMENT

Hereunder, a lighted switch device of an embodiment of the present invention will be described with reference to FIGS. 1 to 3.

Figure 1:
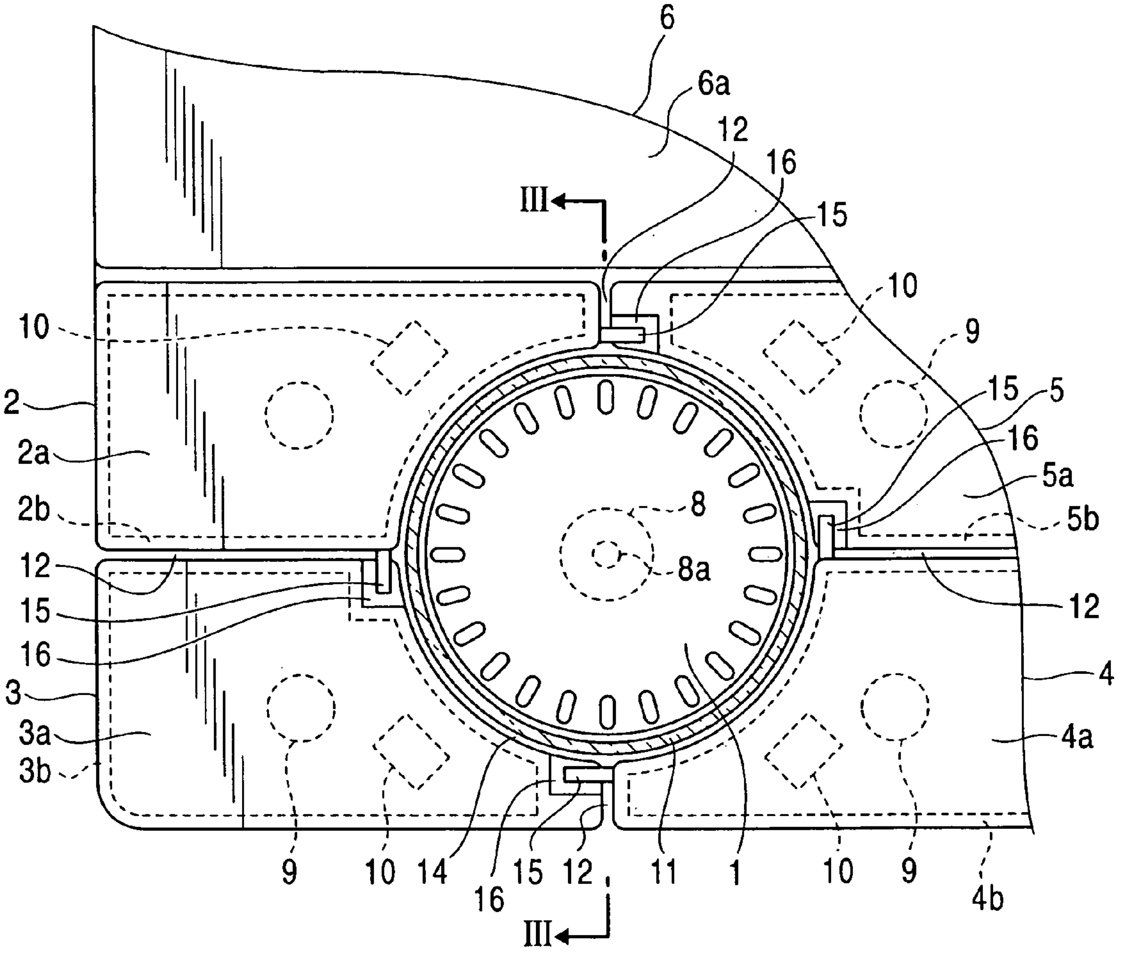
FIG. 1 is a plan view of the main portion of a switch device of an embodiment of the present invention.
Figure 2:
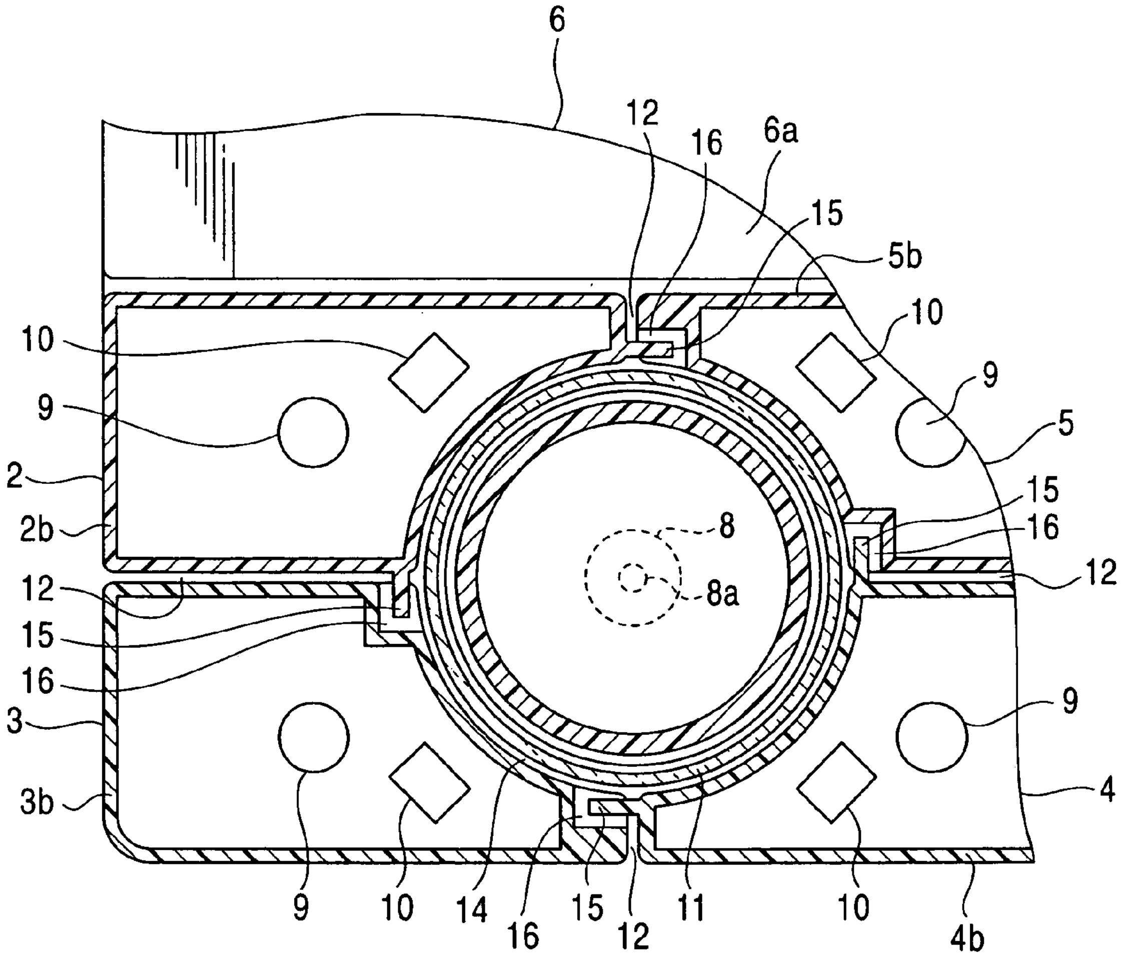
FIG. 2 is a sectional view of the main portion of the structure of a portion of the switch device of the embodiment of the present invention where light-shielding members are formed.
Figure 3:
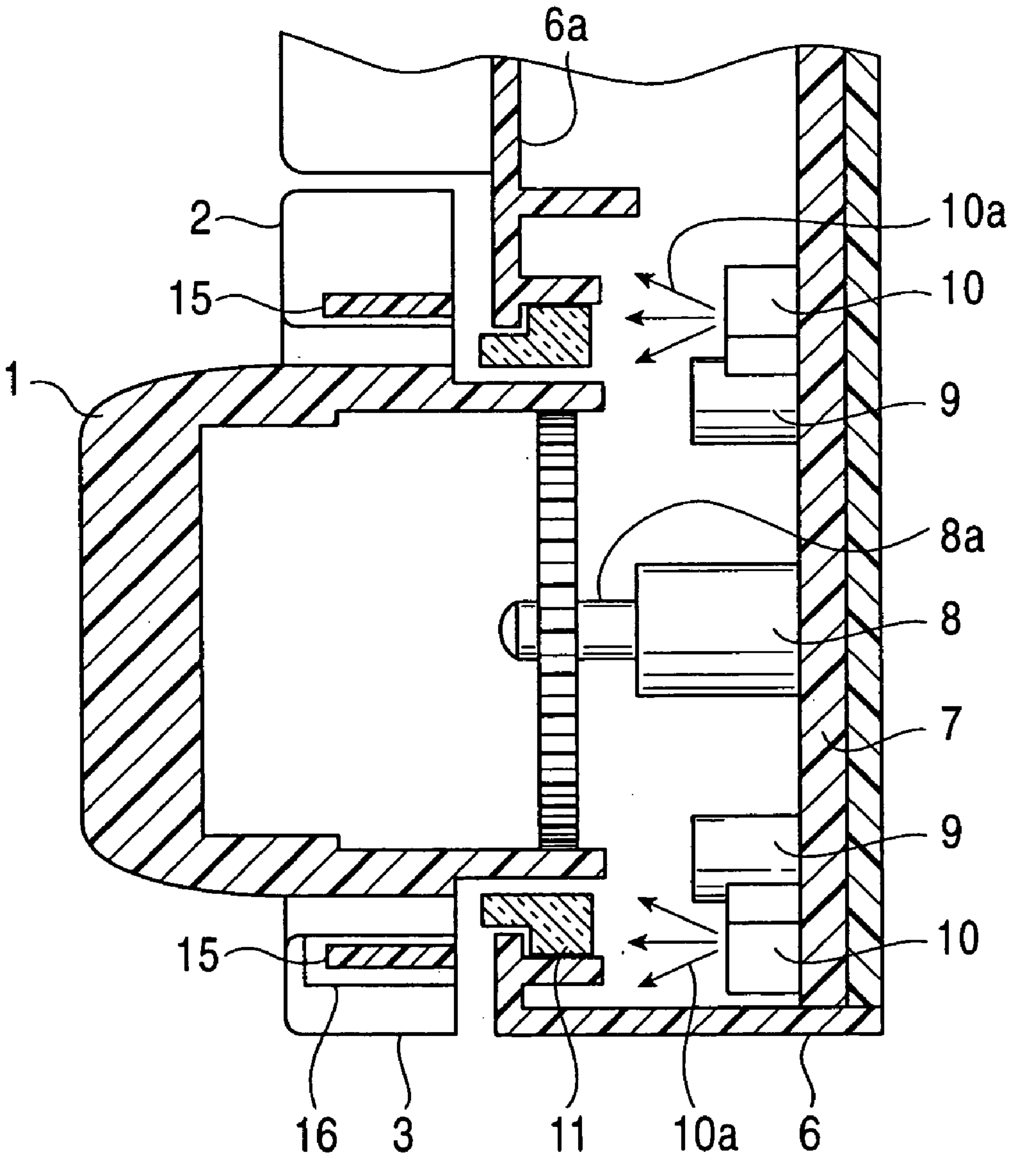
FIG. 3 is a sectional view taken along line III—III of FIG. 1.
Figure 4:
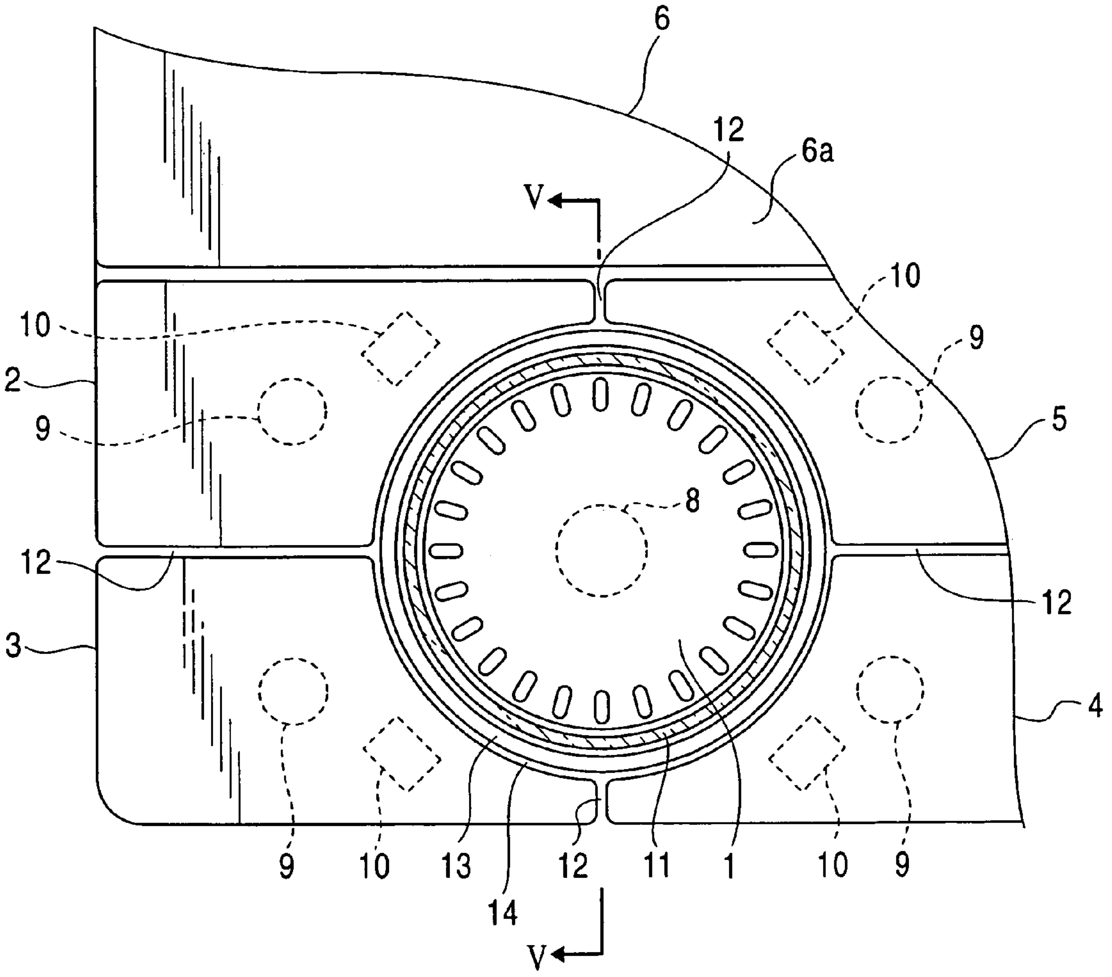
FIG. 4 PRIOR ART
FIG. 4 is a plan view of the main portion of a related switch device.
Figure 5:
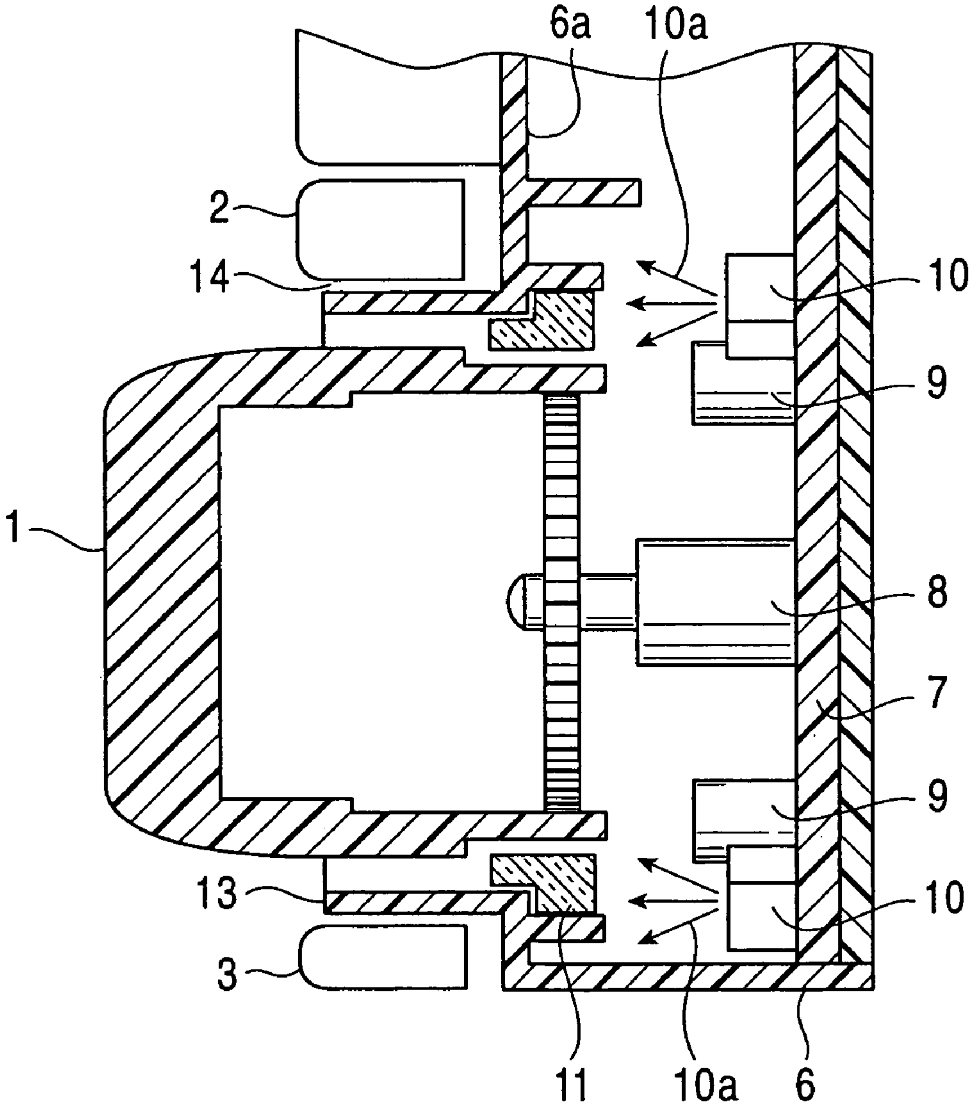
FIG. 5 PRIOR ART
FIG. 5 is a sectional view taken along line V—V of FIG. 4.

As shown in FIGS. 1 to 3, the lighted switch device of the embodiment has basically the same structure as the related lighted switch device. It comprises one rotary knob (first operating knob) 1, four push knobs (second operating knobs) 2, 3, 4, and 5 disposed around the rotary knob 1, a case 6 having a front plate 6*a* to which the rotary knob 1 and the push knobs 2, 3, 4, and 5 are mounted, a rotation detector 8 mounted to a wiring board 7 and accommodated in the case 6, switch elements 9, LEDs 10 (light-emitting diodes serving as light sources), and an annular light conductor 11 for transmitting exiting light 10*a* from the LEDs 10 to the outer peripheral portion of the rotary knob 1.

The rotary knob 1 is injection molded out of resin and into the shape of a cap including a top surface la and a cylindrical portion 1b, and is rotatably mounted to the front plate 6*a* of the case 6. In order to make it possible for an operator to see the function of the rotary knob 1, a character, a pictorial character, etc., which is illuminated by the exiting light 10*a* from the LEDs 10, may be indicated on the top surface 1*a* of the rotary knob 1.

The push knobs 2, 3, 4, and 5 are injection molded out of resin and into the shape of a tray, and are mounted to the front plate 6*a* of the case 6 so that they can be pushed. The push knob 2 has a push surface 2*a* and a flange 2*b*. The push knob 3 has a push surface 3*a* and a flange 3*b*. The push knob 4 has a push surface 4*a* and a flange 4*b*. The push knob 5 has a push surface 5*a* and a flange 5*b*. As shown in FIG. 2, plate-shaped light-shielding members 15 vertically protrude from a surface of the push knob 2 opposing the push knob 3, a surface of the push knob 2 opposing the push knob 5, a surface of the push knob 4 opposing the push knob 3, and a surface of the push knob 4 opposing the push knob 5, respectively. Recesses 16 into which ends of the light-shielding members 15 are inserted are formed in portions of the push knob 3 opposing the respective light-shielding members 15 and portions of the push knob 5 opposing the respective light-shielding members 15. As shown in FIG. 1, when the ends of the respective light-shielding members 15 are inserted into the respective recesses 16, the push knobs 2, 3, 4, and 5 are disposed close to each other and to the rotary knob 1. In order to make it possible for the operator to see the functions of the respective push knobs 2, 3, 4, and 5, characters, pictorial characters, etc., which are illuminated by the exiting light 10*a* from the LEDs 10, may be indicated on the push surfaces 2*a*, 3*a*, 4*a*, and 5*a* of the push knobs 2, 3, 4, and 5, respectively.

The case 6 is injection molded out of resin and into the shape of a box so that the case 6 can accommodate the wiring board 7, the rotation detector 8, the switch elements 9, the LEDs 10, and the light conductor 11.

The rotation detector 8 may be, for example, a rotary variable resistor or a rotary encoder. Its rotary shaft 8*a* is connected to the rotary knob 1 through a required power transmission device such as a gear mechanism.

The switch elements 9 each comprise a tactile switch and a click rubber disposed on the wiring board 7, and have a contact that is brought into electrical conduction with the wiring board and the click rubber by bending the click rubber. In order to make it possible to reliably operate the switch elements 9, the switch elements 9 are disposed at portions opposing the central portions of the respective push knobs 2, 3, 4, and 5. The switch elements 9 can be directly operated by the respective push knobs 2, 3, 4, and 5, or indirectly operated through a coupling member (not shown), which is called an actuator.

In order to make it possible for the LEDs 10 to uniformly illuminate the area around the rotary knob 1, as shown in FIGS. 1 and 2, the LEDs 10 are disposed at equal intervals around the light conductor 11.

The light conductor 11 is formed of a light-transmissive resin material and into an annular shape. As shown in FIG. 3, the light conductor 11 is disposed around a portion of the case 6 where the rotary knob 1 is disposed.

Since the lighted switch device of the embodiment comprises one rotary knob 1 and four push knobs 2, 3, 4, and 5, when any of the push knobs 2, 3, 4, and 5 are used for selecting functions, such as automatic-manual switching of a vehicle-installed air conditioner, in-vehicle-defrosting switching, temperature setting, and air volume setting, and when the rotary knob 1 is used for temperature adjustment and air volume adjustment, it is possible to match the operational feel of the knobs 1 to 5 and the feel of selecting the respective functions and adjusting the functions. Therefore, the lighted switch device, which is used in a control section of the vehicle-installed air conditioner, provides good operational feel.

In the lighted switch device of the embodiment, the plate-shaped light-shielding members 15 protrude from a surface of the push knob 2 opposing the push knob 3, a surface of the push knob 2 opposing the push knob 5, a surface of the push knob 4 opposing the push knob 3, and a surface of the push knob 4 opposing the push knob 5, respectively. The recesses 16 into which ends of the light-shielding members 15 are inserted are formed in portions of the push knob 3 opposing the respective light-shielding members 15 and portions of the push knob 5 opposing the respective light-shielding members 15. Therefore, the light-shielding members 15 only slightly appear at the surface of the lighted switch device, so that the design of the lighted switch device can be improved. In addition, since each gap 12 between its associated pair of adjacent push knobs is completely closed by its associated light-shielding member 15, it is possible to prevent light from leaking into the gaps 12, so that the rotary knob 1 can be seen well. Further, since it is not necessary to form the light-shielding members at the case 6, a gap 14 between the rotary knob 1 and the push knobs 2, 3, 4, and 5 can be reduced in size, so that, also for this reason, the design of the lighted switch device can be improved, as a result of which the lighted switch device can be reduced in size. Further, since it is not necessary to form the light-shielding members at the case 6, it is possible to simplify and reduce the size of a die used for injection molding of the case 6, and, thus, to reduce the cost of the lighted switch device, which is a product.

Although, in the embodiment, the rotary knob 1 is used as a first operating knob and the push knobs 2, 3, 4, and 5 are used as second operating knobs, the gist of the present invention is not limited thereto, so that push knobs may be used for the first operating knobs and the second operating knobs.

Although, in the embodiment, the light-shielding members 15 are formed at the push knobs 2 and 4, and the recesses 16 are formed in the push knobs 3 and 5, the gist of the present invention is not limited thereto. Therefore, when the gaps 12 are shielded from light, it is possible to omit the recesses 16 formed in the push knobs 3 and 5.

Although, in the embodiment, the four push knobs 2, 3, 4, and 5 are disposed around the rotary knob 1, the gist of the present invention is not limited thereto. Therefore, the number of push knobs disposed around the rotary knob 1 may be changed as required depending upon the purpose of use of the lighted switch device.

What is claimed is:

1. A lighted switch device comprising:

a first operating knob;

a plurality of second operating knobs comprising a pair of adjacent second operating knobs and disposed around the first operating knob;

a case having a front plate for mounting the first operating knob and the plurality of second operating knobs;

a light source accommodated in the case;

a light conductor for transmitting exiting light from the light source to an outer peripheral portion of the first operating knob; and a light-shielding member, which is disposed at one of the pair of adjacent second operating knobs and which protrudes in a gap disposed between the pair of adjacent second operating knobs, for preventing light from leaking into the gap from the light conductor.

2. A lighted switch device according to claim 1, wherein the other of the pair of second operating knobs has a recess for inserting an end of the light-shielding member.

3. A lighted switch device according to claim 1, wherein the first operating knob is a rotary knob, and wherein the plurality of second operating knobs are push knobs.

4. A lighted switch device according to claim 1, wherein the light-shielding member concentrically surrounds the light conductor and has openings between the plurality of second operating knobs.

5. A lighted switch device according to claim 1, wherein the plurality of second operating knobs substantially completely surround the first operating knob.

6. A lighted switch device according to claim 5, wherein the plurality of second operating knobs are disposed such that the light-shielding member is disposed at each second operating knob and protrudes in the gap disposed between adjacent second operating knobs.

7. A lighted switch device according to claim 6, wherein the light-shielding member concentrically surrounds the light conductor and has openings between the plurality of second operating knobs.

8. A lighted switch device according to claim 7, wherein edges of the plurality of second operating knobs match a curvature of the first operating knob.

9. A lighted switch device according to claim 6, wherein each of the plurality of second operating knobs has a recess in which an end of the light-shielding member is disposed.

10. A lighted switch device according to claim 1, wherein the light-shielding member is separate from the case.

11. A lighted switch device according to claim 10, wherein the light-shielding member overlaps the case in a thickness direction of the first operating knob.

12. A lighted switch device according to claim 10, wherein the light-shielding member does not overlap the case in a radial direction of the first operating knob.

13. A lighted switch device according to claim 2, wherein the end of the light-shielding member in the recess overlaps the light-shielding member at the other of the pair of second operating knobs in a radial direction of the first operating switch.

14. A lighted switch device according to claim 2, wherein at least three sides of the end of the light-shielding member in the recess is surrounded by the recess.

15. A lighted switch device according to claim 2, wherein the light-shielding member on the other of the pair of second operating knobs is disposed on at least two sides of the recess.

16. A lighted switch device comprising:

a first operating knob;

a plurality of adjacent second operating knobs disposed around the first operating knob, the adjacent second operating knobs disposed such that a gap is present between the adjacent second operating knobs;

a case having a front plate in which the first operating knob and the plurality of second operating knobs are mounted;

a light source accommodated in the case;

a light conductor through which light from the light source is transmitted to an outer peripheral portion of the first operating knob; and a light-shielding member disposed at the adjacent second operating knobs and extending across the gap, the light-shielding member separate from the case.

17. A lighted switch device according to claim 16, wherein an end of the light-shielding member protrudes into a recess formed in each of the adjacent second operating knobs.

18. A lighted switch device according to claim 17, wherein the light-shielding member at the adjacent second operating knobs and protruding into the recess overlap such that the light-shielding member substantially completely surrounds the first operating knob in a radial direction of the first operating knob.

19. A lighted switch device according to claim 16, wherein the light-shielding member is disposed at edges of the second operating knobs that match a curvature of the first operating knob.

20. A lighted switch device according to claim 16, wherein the light-shielding member that protrudes in the recess does not contact the light-shielding member at the second operating knob containing the recess along an edge of the second operating knob containing the recess.

* * * * *